(12) United States Patent
Watanabe et al.

(10) Patent No.: US 6,594,324 B1
(45) Date of Patent: Jul. 15, 2003

(54) CORRELATION OPERATION METHOD AND MATCHED FILTER

(75) Inventors: Jun Watanabe, Tokyo (JP); Tetsuhiko Miyatani, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/478,215

(22) Filed: Jan. 5, 2000

(30) Foreign Application Priority Data

Jan. 12, 1999 (JP) .............................. 11-005377

(51) Int. Cl.[7] .............................. H04L 27/06; H04B 1/69
(52) U.S. Cl. ..................................... 375/343; 375/152
(58) Field of Search ................................ 375/343, 150, 375/144, 152, 316; 208/422, 426; 324/76.33

(56) References Cited

U.S. PATENT DOCUMENTS 5,590,155 A * 12/1996 Yasuda ........................ 375/261
5,848,096 A * 12/1998 Shou et al. .................. 375/147
6,088,384 A * 7/2000 Hindman .................... 375/150
6,345,077 B1 * 2/2002 Kurihara .................... 375/343

FOREIGN PATENT DOCUMENTS

JP        1079722       3/1998

* cited by examiner

*Primary Examiner*—Khai Tran
(74) *Attorney, Agent, or Firm*—Jacobson Holman PLLC

(57) ABSTRACT

There is disclosed a correlating operation method and a matched filter in which sensitivities in received code sequence selection and path detection are held to some degrees while circuit scale can be reduced. In the correlating operation method and the matched filter, code data obtained by adding or subtracting an in-phase component and a quadrature component of a received code sequence in a code mapping unit, and an in-phase component and a quadrature component of a received complex signal are subjected to correlating operation, and a correlating operation result is subjected to power adding operation to obtain a correlating operation output.

11 Claims, 7 Drawing Sheets

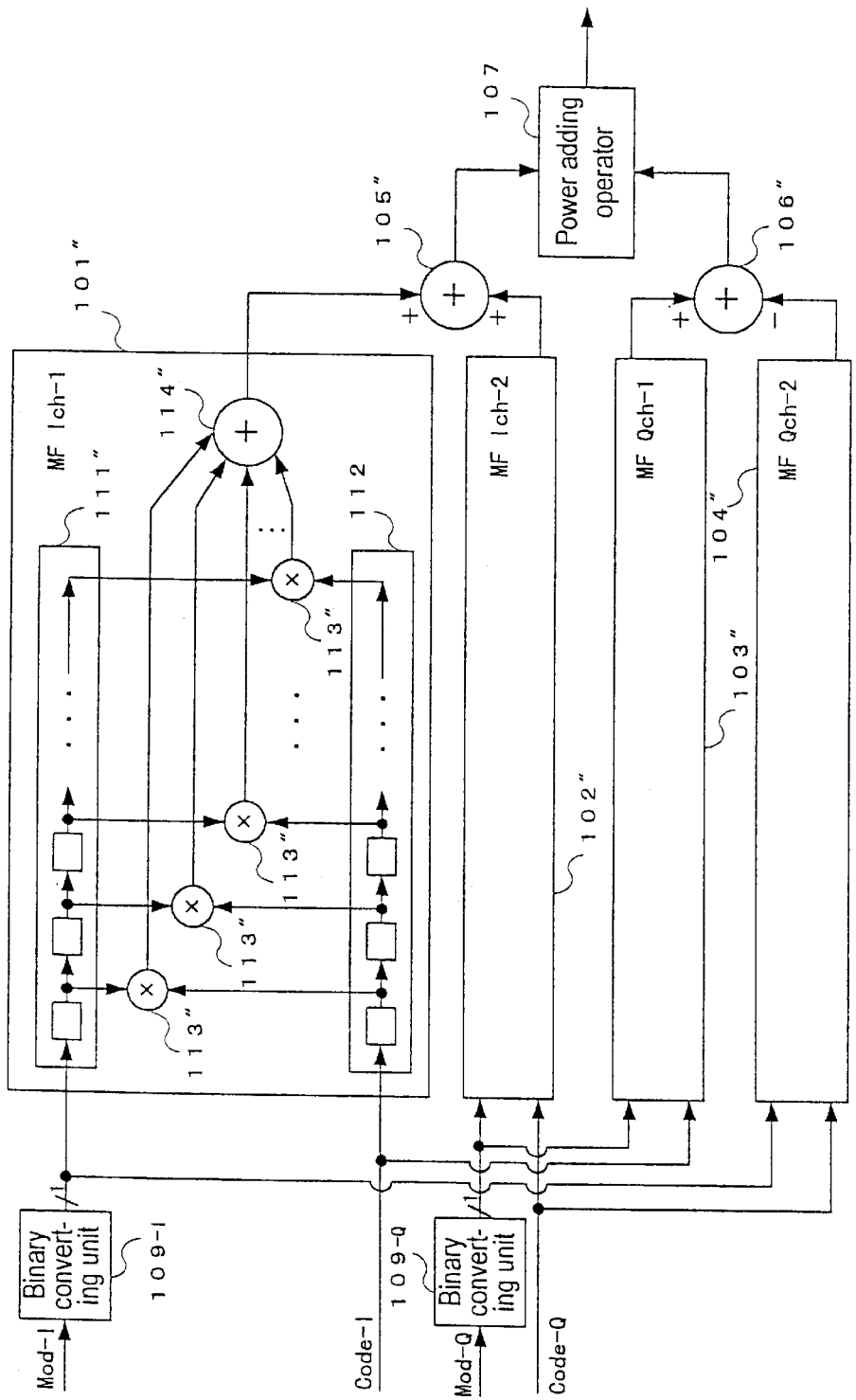

CORRELATION OPERATION METHOD AND MATCHED FILTER

BACKGROUND OF THE INVENTION

1. Field of the Invention

The present invention relates to a correlator (matched filter) used in de-spreading method on a receiver in code division multiple access (CDMA) for use in a spread spectrum communication system, particularly to a matched filter which can reduce a circuit scale without deteriorating a path detection sensitivity.

2. Description of the Related Art

In a CDMA system, after primary modulation of information data is performed in a transmitting unit, code modulation (secondary modulation) is performed using a sequence of codes (a sequence of transmitted codes) having a faster rate than that of the data modulation (primary modulation), so that a transmitted complex signal is generated.

In CDMA data communication in which quadrature phase shift keying (QPSK) is used as a system of modulating the information data and codes, when the information data is set to S, and the transmitted code sequence is set to C, a transmitted complex signal TX can be represented as follows:

$$TX = S \cdot C \quad \text{[Equation 1]}$$
$$= (Si + jSq) \cdot (Ci + jCq)$$
$$= (Si \cdot Ci - Sq \cdot Cq) + j(Si \cdot Cq + Sq \cdot Ci)$$
$$= TXi + jTXq$$

Here, for the information data S, when an in-phase component is represented by Si, and a quadrature component is represented by Sq, the in-phase component and the quadrature component are in an orthogonal relation, and the quadrature component Sq is multiplied by an imaginary number j and represented. Similarly, for the code sequence C, when an in-phase component is represented by Ci, and a quadrature component is represented by Cq, the in-phase component and the quadrature component are in the orthogonal relation, and the quadrature component Cq is multiplied by the imaginary number j and represented.

Furthermore, when the transmission information data is taken from the transmitted complex signal, that is, the data demodulation (de-spreading) is performed on the side of the receiving unit, the received complex signal and the transmitted code sequence used in the spreading modulation need to be subjected to the complex conjugate correlating operation.

In this case, a searcher for use on the receiver side of the CDMA system has a role of synchronization capture to select a code which is complex/conjugate with the transmitted code sequence used in the spreading modulation on the transmission side, that is, an accurate received code sequence, and further to find the transmission timing of the transmitted complex signal.

A procedure of selecting the received code sequence in the searcher comprises, in the same manner as in the data demodulation, performing the complex conjugate correlating operation of the received complex signal and the received code sequence, and performing power adding operation with respect to the operation result of the in-phase component and the quadrature component.

Here, a principle of selecting the received code sequence in the searcher will be described.

A first case will be described in which a certain code sequence C* in a complex conjugate relation with the transmitted code sequence used for generating the transmitted complex signal in the transmitter is used as a received code sequence during the correlating operation of the searcher.

Assuming that a transmitted complex signal is TX, the transmitted complex signal TX is subjected to code modulation as shown in [Equation 1] in the transmitting unit, and that the transmitted complex signal TX is received as it is to form a received complex signal, a correlating operation result R1 of the code sequence C* having the complex conjugate relation with the transmitted code sequence C, and the transmitted (received) complex signal TX is represented by the following equation:

$$R1 = TX \cdot C^* \quad \text{[Equation 2]}$$
$$= (TXi + jTXq) \cdot (Ci - jCq)$$
$$= TXi \cdot Ci + TXq \cdot Cq + j(TXq \cdot Ci - TXi \cdot Cq)$$

In the above [Equation 2], the multiplying (correlating) operations of the in-phase component TXi and quadrature component TXq of the received complex signal, and the in-phase component Ci and quadrature component Cq of the received code sequence used in the searcher are independently performed. This means that four correlators have to be prepared as hardware.

Moreover, for the second stage of the above [Equation 2], when TXi+jTXq is developed according to [Equation 1], the following is obtained:

$$R1 = \{(Si \cdot Ci - Sq \cdot Cq) + j(Si \cdot Cq + Sq \cdot Ci)\} \cdot (Ci - jCq)$$
$$= (Si \cdot Ci \cdot Ci - Sq \cdot Cq \cdot Ci + Si \cdot Cq \cdot Cq + Sq \cdot Ci \cdot Cq) +$$
$$j(Si \cdot Cq \cdot Ci + Sq \cdot Ci \cdot Ci - Si \cdot Ci \cdot Cq + Sq \cdot Cq \cdot Cq)$$

When the multiplication of the code sequence is represented as a correlating operation result by a correlation function Rxx, the following is obtained:

$$= (Si \cdot Rii - Sq \cdot Riq + Si \cdot Rqq + Sq \cdot Riq) + \quad \text{[Equation 3]}$$
$$j(Si \cdot Riq + Sq \cdot Rii - Si \cdot Riq + Sq \cdot Rqq)$$
$$= Si \cdot (Rii + Rqq) + jSq \cdot (Rii + Rqq)$$

Here, the correlation function Rxx indicates the correlating operation result of a certain code sequence and another code sequence. When two affixed letters are the same, a result (auto-correlation function) of the correlating operation of the same code sequence is indicated. When the affixed letters are different, the function is classified as a result (cross-correlation function) of the correlating operation of different code sequence.

Here, for the system of codes in the CDMA system, the auto-correlation function is highest, and the cross-correlation function has a sufficiently small value as compared with the auto-correlation function. Therefore, for the sake of simplicity, the auto-correlation function is defined as 1, and the cross-correlation function is defined as 0 in the description.

According to the above-described definition, the correlating operation result R1 of the searcher obtained by [Equation 3] can be represented as follows:

$$R1 = 2 \cdot Si + j2 \cdot Sq = X + jY \quad \text{[Equation 4]}$$

When power adding operation is performed on the operation result of the in-phase component and the quadrature component obtained by [Equation 4], the following results:

$$P1 = |X|^2 + |Y|^2 = 4 \cdot (|Si|^2 + |Sq|^2)$$

For the information data Si, Sq, when data of ±1 is transmitted, the following result is obtained:

$$P1 = 4 \cdot (1+1) = 8$$

This means that when the received code sequence comprises the code sequence C* having the complex conjugate relation with the transmitted code sequence C, the power adding operation P1 obtains a constant value of 8 irrespective of the content of transmission information (information data Si, Sq).

A second case will next be described in which a code sequence Cn not placed in the complex conjugate relation with the transmitted code sequence C used for generating the transmitted complex signal in the transmitter is used as the received code sequence in the correlating operation of the searcher.

In the same manner as in the first case, assuming that the transmitted complex signal is TX, the transmitted complex signal TX is subjected to the code modulation as shown in [Equation 1] in the transmitting unit, and the transmitted complex signal TX is received as it is to form a received complex signal, a correlating operation result R2 of the code sequence Cn not placed in the complex conjugate relation with the code sequence C, and the transmitted (received) complex signal TX is represented and developed by the following equation:

$$\begin{aligned} R2 &= TX \cdot Cn \quad \text{[Equation 5]} \\ &= (TXi + jTXq) \cdot (Ck - jCr) \\ &= \{(Si \cdot Ci - Sq \cdot Cq) + j(Si \cdot Cq + Sq \cdot Ci)\} \cdot (Ck - jCr) \\ &= (Si \cdot Rik - Sq \cdot Rkq + Si \cdot Rqr + Sq \cdot Rir) + \\ &\quad j(Si \cdot Rkq + Sq \cdot Rik - Si \cdot Rir + Sq \cdot Rqr) \end{aligned}$$

Here, since the correlation functions Rxx in [Equation 5] are all cross-correlation functions, it can be seen that Rxx=0, and R2=0.

As apparent from the power adding operation results R1, R2 in the above-described two cases, only when the transmitted code sequence C used in the transmitter and the received code sequence used in the operation of the searcher are in the complex conjugate relation, a large power adding operation result is obtained.

Specifically, by referring to the level of the power adding operation result, it can be judged whether the transmitted code sequence C on the transmission side and the received code sequence selected on the reception side agree with each other.

Moreover, when the above-described power adding operation result is observed with time, a large power adding operation result output is obtained at a certain timing. Since the appearing timing is a transmitted signal timing to which the influence of propagation in air is added, path detection can also be realized by observing a large power adding operation result output.

In an example as one measure for realizing the correlator for the searcher to perform the correlating operation of the transmitted complex signal and the received code sequence, a matched filter is used.

Here, the conventional constitution example of the matched filter used as the correlator for the searcher will be described with reference to FIG. 6. FIG. 6 is a constitution block diagram of the conventional matched filter.

The conventional matched filter is constituted of four correlating operators 101', 102', 103', 104', two adders 105', 106', and a power adding operator 107'.

Each component of the conventional matched filter will be described.

The correlating operator 101' is a correlating operator (MF Ich-1 in FIG. 6) which inputs the in-phase component TXi (Mod-I in FIG. 6) of the received complex signal TX, and the in-phase component Ci of the received code sequence C* (Code-I in FIG. 6) and takes the correlation of both components to output a correlation result.

Additionally, this correlating operator 101' realizes the operation of a first term (TXi·Ci) in the rightmost side of the above-described [Equation 2].

The inside of the correlating operator 101' is constituted of a data register 111' formed of a plurality of shift registers for successively time-shifting and holding the in-phase component TXi of the received complex signal TX, a code register 112 for successively time-shifting and holding the in-phase component Ci of the received code sequence C*, a plurality of multipliers 113' for performing multiplication of the data held by the data register 111' and the data held by the code register 112, and an adder 114' for adding multiplication results in the multipliers 113'.

The correlating operator 102' is a correlating operator (MF Ich-2 in FIG. 6) which inputs the quadrature component TXq (Mod-Q in FIG. 6) of the received complex signal TX and the quadrature component Cq (Code-Q in FIG. 6) of the received code sequence C* and takes the correlation of both components to output a correlation result.

Additionally, this correlating operator 102' realizes the operation of the second term (TXq·Cq) in the rightmost side of the above-described [Equation 2].

The correlating operator 103' is a correlating operator (MF Qch-1 in FIG. 6) which inputs the quadrature component TXq (Mod-Q in FIG. 6) of the received complex signal TX and the in-phase component Ci (Code-I in FIG. 6) of the received code sequence C* and takes the correlation of both components to output a correlation result.

Additionally, this correlating operator 103' realizes the operation of the third term (TXq·Ci) in the rightmost side of the above-described [Equation 2].

The correlating operator 104' is a correlating operator (MF Qch-2 in FIG. 6) which inputs the in-phase component TXi (Mod-I in FIG. 6) of the received complex signal TX and the quadrature component Cq (Code-Q in FIG. 6) of the received code sequence C* and takes the correlation of both components to output a correlation result.

Additionally, this correlating operator 104' realizes the operation of the fourth term (TXi·Cq) in the rightmost side of the above-described [Equation 2].

Since the inside of the correlating operator 102', 103' or 104' is similar to that of the correlating operator 101', it is not shown in FIG. 6, but it is constituted of a data register for successively time-shifting and holding the received complex signal TX inputted in each correlating operator, a code register for successively time-shifting and holding the received code sequence C*, a plurality of multipliers for performing multiplication of the data held by the data register and the data held by the code register, and an adder for adding multiplication results in the multipliers.

The adder 105' is an in-phase component adder for adding the correlation result from the correlating operator 101' and the correlation result from the correlating operator 102' to output an in-phase component correlation result.

Additionally, this adder 105' realizes the adding operation of the first and second terms in the rightmost side of the above-described [Equation 2].

The adder 106' is a quadrature component adder for adding the correlation result from the correlating operator 103' and the correlation result from the correlating operator 104' to output a quadrature component correlation result.

Additionally, this adder 106' realizes the subtracting operation of the third and fourth terms in the rightmost side of the above-described [Equation 2].

The power adding operator 107 performs the power adding operation of the in-phase component correlation result from the adder 105' and the quadrature component correlation result from the adder 106', and outputs a final correlating operation result.

For the operation in the conventional matched filter, in each of the correlating operators 101', 102', 103', 104', the components of the received complex signal TX successively time-shifted and held in the data register 111' or the like, and the components of the received code sequence C* successively time-shifted and held in the received code register 112 or the like are multiplied/operated in the multipliers 113' or the like, and the multiplication results are added in the adder 114' or the like, so that each correlation result is outputted.

Subsequently, the correlation results from the correlating operators 101', 102' are added as the in-phase components by the adder 105', the correlation results from the correlating operators 103', 104' are added (subtracted) as the quadrature components by the adder 106', the correlation results of the in-phase and quadrature components are subjected to the power adding operation by the power adding operator 107, and a final correlating operation result is outputted, so that the selection of the received code sequence and the detection of the path are performed based on the output.

When the matched filter is used in the correlator, the received complex signals and received code sequence can be accumulated for a certain time. Therefore, even when the transmission timing of the transmitter, that is, the path timing is not known, by inputting the received complex signals to the data register 111', and the like while holding a certain series of codes, it can be judged in at least one series of time whether the selected received code sequence and transmitted code sequence agree with each other.

Moreover, when the selected received code sequence and transmitted code sequence agree with each other, a large power adding operation result is outputted at a certain timing, so that the path detection can be realized as described above.

In the above-described conventional matched filter, however, the received complex signals and received code sequence are held for a certain time, and the multiplication in each time series, and the addition of the multiplication results are performed, so that the hard scale is remarkably enlarged. Moreover, when the correlating operation of QPSK-modulated received complex signals is performed, four correlating operators (101' to 104') need to be disposed from this nature, which causes a problem that the circuit scale becomes huge.

Therefore, in order to reduce the hard scale of each of the correlating operators 101' to 104' in FIG. 6, a method is proposed which comprises reducing the number of bits of each multiplier 113' disposed inside, and the like to decrease the number of bits of each adder 114', in-phase component adder 105', and quadrature component adder 106', so that the hard scale is reduced.

Since the received code sequence are held in the code register 112, and the like in one bit of time series, in order to decrease the number of bits of the multipliers 113', and the like, the number of bits of the data register 111', and the like is decreased, so that as a result, the number of bits of the multipliers 113', and the like is decreased.

Here, a matched filter constituted to reduce the circuit scale of the conventional matched filter shown in FIG. 6 will be described with reference to FIG. 7. FIG. 7 is a block diagram of the matched filter constituted to reduce the circuit scale of the conventional matched filter.

As shown in FIG. 7, the matched filter constituted to reduce the circuit scale of the conventional matched filter is provided with four correlating operators 101", 102", 103", 104", two adders 105", 106", and a power adding operator 107, which are constituted in the same manner as in the conventional matched filter shown in FIG. 6, and is additionally provided with characteristic portions of binary converting units 109-I, 109-Q.

Here, the binary converting unit 109 binarizes the received complex signal and outputs one bit of data to the correlating operator, the binary converting unit 109-I binarizes the in-phase component of the received complex signal, and the binary converting unit 109-Q binarizes the quadrature component of the received complex signal.

Specifically, the binary converting unit 109 quantizes the received complex signal with A/D converter, and the like, converts the signal to digital data, takes its most significant bit (MSB), or performs binarizing otherwise.

In the matched filter of FIG. 7, the received complex signal is one-bit binarized ("0", "1") and inputted to the correlating operator 111", and the like. For example, when "0" as decimal −1, or "1" as decimal +1 is multiplied by the received code sequence ("0" is defined as −1, and "1" is defined as +1 in the same manner), as a result, +1 or −1 is obtained in decimal notation.

This multiplication result can be represented as "11", "01" in binary notation, and in order to perform the addition of multiplication results, the two-bit adders 114", 105", 106" may be prepared as a result.

In the operation of the matched filter of FIG. 7, the components of the received complex signal TX are binarized by the binary converting unit 109 and converted to one bit of data, successively time-shifted and held in the data register 111', and the like. The subsequent operation is the same as that of the conventional matched filter.

However, in the matched filter shown in FIG. 7, since the data inputted to the data register 111" or the like is of one bit, each shift register constituting the data register 111" or the like may be a register of one bit. Furthermore, since the data inputted to each multiplier 113" or the like is of one bit, each multiplier 113" or other constitution is reduced. Additionally, when the number of bits outputted from each multiplier 113" or the like decreases, the number of input bits of the adders 114", 105", 106" decreases. Therefore, the circuit scale of each adder is reduced, and as a result the entire circuit scale of the matched filter is reduced.

In the matched filter of FIG. 7, the circuit scales of the multiplier 113" and adders 114", 105", 106" are reduced by binarizing the inputted received complex signal, and as a result the entire circuit scale is reduced, but different from the correlating operation of the n-bit accuracy data register 111' to the code register 112 in the conventional matched filter of FIG. 6, the correlating operation of one bit accuracy to the code register 112 is performed, which lowers the operation accuracy and which causes a problem that the sensitivities in code determination and path selection are deteriorated.

SUMMARY OF THE INVENTION

The present invention has been developed in consideration of the above-described actual circumstances, and an object thereof is to provide a correlating operation method and a matched filter which can reduce the circuit scale without deteriorating sensitivities in the selection of received code sequence and the detection of paths.

According to the present invention, there is provided a correlating operation method, comprising: performing correlating operation of code data obtained by adding or subtracting an in-phase component and a quadrature component of a received code sequence, and an in-phase component and a quadrature component of a received complex signal; and performing power adding operation of an in-phase component correlation result and a quadrature component correlation result to obtain a correlating operation output, in which a section for performing the correlating operation of the received code sequence and the received complex signal can be realized by two sections, so that circuit scale is reduced, and power consumption can be curtailed.

According to another aspect of the present invention, there is provided a correlating operation method, comprising: inputting an in-phase component and a quadrature component of a received code sequence, and ternary-converting and inputting an in-phase component and a quadrature component of a received complex signal;

performing a first correlating operation of the ternary-converted in-phase component of the received complex signal and the in-phase component of the received code sequence, a second correlating operation of the ternary-converted quadrature component of the received complex signal and the quadrature component of the received code sequence, a third correlating operation of the ternary-converted quadrature component of the received complex signal and the in-phase component of the received code sequence, and a fourth correlating operation of the ternary-converted in-phase component of the received complex signal and the quadrature component of the received code sequence;

adding results of the first and second correlating operations to output an in-phase component correlation result, and adding results of the third and fourth correlating operations to output a quadrature component correlation result; and performing power adding operation of the in-phase component correlation result and the quadrature component correlation result to obtain a correlating operation output. The components of the received complex signal are ternary-converted, and the number of bits is reduced, before taking, shifting, accumulating, further multiplying and adding the components. Therefore, as compared with the matched filter in which the constitution of the multiplying section and multiplication result adding section during the correlating operation is reduced and the components of the received complex signal are binary-converted and taken, the sensitivities in the selection of the received code sequence and the detection of the path can be held to some degrees.

According to further aspect of the present invention, there is provided a matched filter, comprising: an adding/subtracting unit for adding or subtracting an in-phase component and a quadrature component of a received code sequence to output code data; an in-phase component multiplying unit for multiplying in-phase component data obtained by successively time-shifting the in-phase component of the received complex signal and the code data outputted from the adding/subtracting unit; a quadrature component multiplying unit for multiplying quadrature component data obtained by successively time-shifting the quadrature component of the received complex signal and the code data outputted from the adding/subtracting unit; an in-phase component adding unit for adding the output from the in-phase component multiplying unit to output an in-phase component correlation result; a quadrature component adding unit for adding the output from the quadrature component multiplying unit to output a quadrature component correlation result; and a power adding operation unit for performing power adding operation of the in-phase component correlation result and the quadrature component correlation result to output a correlating operation result, in which the section for performing the correlating operation of the received code sequence and the received complex signal can be realized by two sections, the circuit scale is reduced, and the power consumption can be curtailed.

According to still another aspect of the present invention, there is provided a matched filter, comprising: ternary-converting an in-phase component and a quadrature component of a received complex signal; performing correlating operation with code data obtained by adding or subtracting an in-phase component and a quadrature component of a received code sequence; and performing power adding operation of correlation results of the in-phase component and the quadrature component to obtain a correlating operation output, in which the section for performing the correlating operation of the received code sequence and the received complex signal can be realized by two sections. Furthermore, by ternary-converting the components of the received complex signal, and reducing the number of bits before taking the components, the sensitivities in the selection of the received code sequence and the detection of the path are held to some degrees, while the constitution of the correlating operation section can further be reduced.

BRIEF DESCRIPTION OF THE DRAWINGS

FIG. 7 is a constitution block diagram of a matched filter constituted to reduce the circuit scale of the conventional matched filter.

Figure 1:
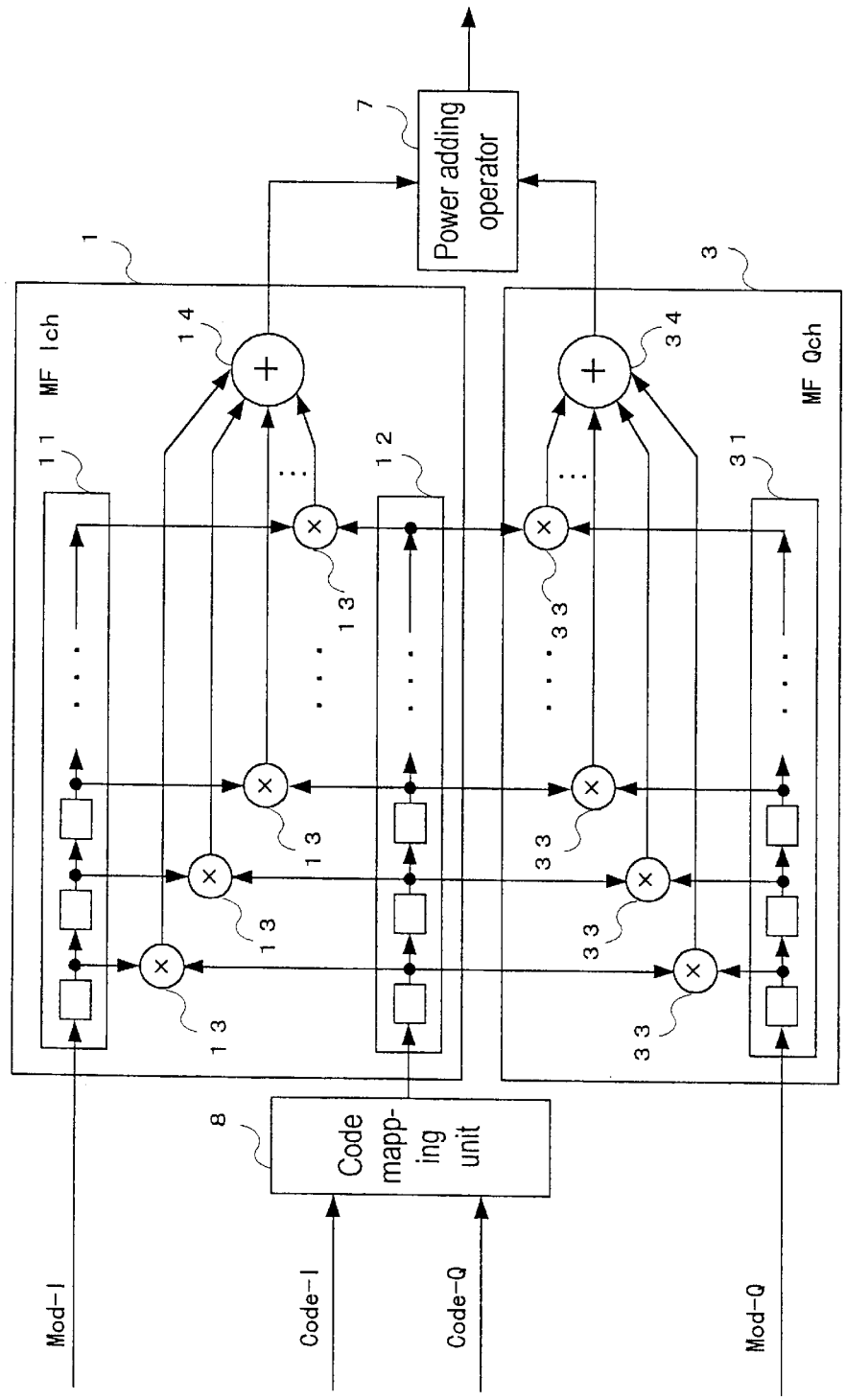
FIG. 1 is a constitution block diagram of a matched filter according to a first embodiment of the present invention.

DESCRIPTION OF THE REFERENCE NUMERALS 1, 1', 3, 3', 101, 101', 101", 102, 102', 102", 103, 103', 103", 104, 104', 104" . . . correlating operator, 11, 11', 31, 31', 111, 111', 111" . . . data register, 12, 32, 112 . . . code register, 13, 13', 33, 33', 113, 113', 113" . . . multiplier, 14, 14', 34, 34', 114, 114', 114" . . . adder, 105, 105', 105", 106, 106', 106" . . . adder, 7, 107 . . . power adding operator, 8 . . . code mapping unit, 108 . . . ternary converting unit, 109 . . . binary converting unit.

DESCRIPTION OF THE PREFERRED EMBODIMENTS

Embodiments of the present invention will be described with reference to the drawings.

Since a correlating operation method and a matched filter according to a first embodiment of the present invention comprise performing correlating operation of code data obtained by adding or subtracting an in-phase component and a quadrature component of a received code sequence, and an in-phase component and a quadrature component of a received complex signal, and performing power adding operation of the result to obtain a correlation output, the section for performing the correlating operation of the received code sequence and the received complex signal can be realized by two sections, so that the circuit scale can remarkably be reduced.

First, the principle of the correlating operation in the matched filter according to the first embodiment of the present invention will be described.

As described in the related art, in CDMA data communication in which quadrature phase shift keying (QPSK) is used as a system of modulating the information data and codes, when the information data is set to S, and the transmitted code sequence is set to C, the transmitted complex signal TX can be represented as follows:

$$TX = S \cdot C \quad \text{[Equation 1]}$$
$$= (Si + jSq) \cdot (Ci + jCq)$$
$$= (Si \cdot Ci - Sq \cdot Cq) + j(Si \cdot Cq + Sq \cdot Ci)$$
$$= TXi + jTXq$$

In this case, for example, assuming that the in-phase component (I phase) and the quadrature component (Q phase) of the received code sequence are equal to the in-phase component (I phase) and the quadrature component (Q phase) of the transmitted code sequence, and the added components are used as the received code sequence in the correlating operation, a correlating operation result R3 is obtained, and can be represented by the following equation:

$$R3 = (TXi + jTXq) \cdot (Ci + Cq) \quad \text{[Equation 6]}$$
$$= TXi \cdot (Ci + Cq) + jTXq \cdot (Ci + Cq)$$

The above [Equation 6] means that the multiplying (correlating) operations of the addition results of the in-phase component Txi and the quadrature component TXq of the transmitted complex signal, and the in-phase component Ci and the quadrature component Cq of the received code sequence used in the searcher are independently performed, that is, that hardware can be realized by two correlators.

Moreover, for the second stage of the above [Equation 6], when Txi, TXq are developed according to [Equation 1], the following is obtained:

$$R3 = (Si \cdot Ci - Sq \cdot Cq) \cdot (Ci + Cq) +$$
$$j\{(Si \cdot Cq + Sq \cdot Ci)\} \cdot (Ci + Cq)$$
$$= (Si \cdot Ci \cdot Ci + Si \cdot Ci \cdot Cq - Sq \cdot Cq \cdot Ci - Sq \cdot Cq \cdot Cq) +$$
$$j(Si \cdot Cq \cdot Ci + Si \cdot Cq \cdot Cq + Sq \cdot Ci \cdot Ci + Sq \cdot Ci \cdot Cq)$$

When the multiplication of the code sequence is represented as a correlating operation result by a correlation function Rxx, the following is obtained:

$$= (Si \cdot Rii + Si \cdot Riq - Sq \cdot Riq - Sq \cdot Rqq) + \quad \text{[Equation 7]}$$
$$j(Si \cdot Riq + Si \cdot Rqq + Sq \cdot Rii + Sq \cdot Riq)$$
$$= Si \cdot (Rii + Riq) - Sq \cdot (Riq + Rqq) +$$
$$j\{Si \cdot (Riq + Rqq) + Sq \cdot (Rii + Riq)\}$$

Here, in the same manner as in the conventional art, when the auto-correlation function and cross-correlation function are defined as 1 and 0, respectively, the correlating operation result R3 of the searcher obtained by [Equation 7] is as follows:

$$R3 = (Si - Sq) + j(Si + Sq) = X' + jY' \quad \text{[Equation 8]}$$

Furthermore, by performing the power adding operation, the following results:

$$P2 = |X'|^2 + |Y'|^2 = (|Si - Sq|^2 + |Si + Sq|^2) \quad \text{[Equation 9]}$$
$$= 2 \cdot (|Si|^2 + |Sq|^2)$$

For the information data Si, Sq, when data of ±1 is transmitted, the following result is obtained:

$$P2 = 4$$

In the same manner as in the conventional art, this means that when the components of the received code sequence are similar to the components of the transmitted code sequence C, the power adding operation result P2 obtains a constant value of 4 irrespective of the content of the transmission information (information data Si, Sq).

Moreover, assuming that the in-phase component (I phase) and quadrature component (Q phase) of the received code sequence are not equal to the in-phase component (I phase) and quadrature component (Q phase) of the transmitted code sequence, and the added codes are used in the correlating operation, a correlating operation result R4 is obtained, and represented and developed by the following equation.

$$R4 = (Txi + jTXq) \cdot (Ck + Cr) \quad \text{[Equation 10]}$$
$$= TXi \cdot (Ck + Cr) + jTXq \cdot (Ck + Cr)$$
$$= (Si \cdot Ci - Sq \cdot Cq) \cdot (Ck + Cr) +$$
$$j(Si \cdot Cq + Sq \cdot Ci) \cdot (Ck + Cr)$$
$$= Si \cdot (Rik + Rir) - Sq \cdot (Rkq + Rqr) +$$
$$j\{Si \cdot (Rkq + Rqr) + Sq \cdot (Rik + Rir)\}$$

Here, since the correlation functions Rxx in [Equation 10] are all cross-correlation functions, it can be seen that Rxx=0, then R4=0.

As a result, even by adding the in-phase component (I phase) and quadrature component (Q phase) of the received code sequence and using them in the correlating operation, in the same manner as in the conventional art, a large power adding operation result can be obtained only when the transmitted code sequence used in the transmitter and the received code sequence used in the searcher operation agree with each other. Therefore, it can be judged whether the transmitted code sequence and the received code sequence agree with each other. It can further be seen that the transmission timing of the transmitter, that is, the path can be detected.

Additionally, the example in which the in-phase component (I phase) and quadrature component (Q phase) of the received code sequence are added and used in the correlating operation has been described above, but even if the in-phase component (I phase) and quadrature component (Q phase) of the received code sequence are subtracted and used in the correlating operation, [Equation 6] results in the following:

$$R3 = (Txi + jTXq) \cdot (Ci - Cq)$$

In the subsequent development process, plus and minus are reversed in some portions, but the final equation of the power adding operation becomes similar to the rightmost side of [Equation 9], and the power adding operation result P2 has a constant value 4 irrespective of the content of transmission information (information data Si, Sq).

Therefore, even by subtracting the in-phase component (I phase) and quadrature component (Q phase) of the received code sequence for use in the correlating operation, in the same manner as in the conventional art, a large power adding operation result can be obtained only when the transmitted code sequence used in the transmitter and the received code sequence used in the searcher operation agree with each other. Therefore, it can be judged whether the transmitted code sequence and the received code sequence agree with each other. It can further be seen that the transmission timing of the transmitter, that is, the path can be detected.

The matched filter for realizing the above-described correlating method of the present invention will next be described with reference to FIG. 1. FIG. 1 is a constitution block diagram of the matched filter according to the first embodiment of the present invention.

As shown in FIG. 1, the matched filter (a first matched filter) according to the first embodiment of the present invention is constituted of a code mapping unit 8, a correlating operator 1, a correlating operator 3, and a power adding operator 7.

Each component of the first matched filter of the present invention will be described.

The code mapping unit 8 inputs the in-phase component Ci (Code-I in FIG. 1) and quadrature component Cq (Code-Q in FIG. 1) of a received code sequence C*, performs an addition or subtraction processing of both components, and outputs code data. Specifically, the code mapping unit 8 is a adding/subtracting unit for adding or subtracting the in-phase component and quadrature component of the received code sequence.

The correlating operator 1 is a correlating operator (MF Ich in FIG. 1) which inputs the in-phase component TXi (Mod-I in FIG. 1) of a received complex signal TX, and the code data from the code mapping unit 8 and takes the correlation of both to output an in-phase component correlation result.

Additionally, this correlating operator 1 realizes the operation of a first term $\{TXi \cdot (Ci+Cq)\}$ in the rightmost side of the above-described [Equation 6].

The inside of the correlating operator 1 is constituted of a data register 11 formed of a plurality of shift registers for successively time-shifting and outputting and holding the in-phase component TXi of the received complex signal TX, a code register 12 for successively time-shifting and outputting and holding the code data from the code mapping unit 8, a plurality of multipliers 13 for performing multiplication of the data outputted from the data register 11 and the data outputted from the code register 12, and an adder 14 for adding multiplication results in the multipliers 13.

Additionally, the data register 11, code register 12, a plurality of multipliers 13, and adder 14 herein correspond to the claimed data in-phase component register, code data register, in-phase component multiplier group (in-phase component multiplying unit), and in-phase component adder (in-phase component adding unit), respectively.

The correlating operator 3 is a correlating operator (MF Qch in FIG. 1) which inputs the quadrature component TXq (Mod-Q in FIG. 1) of the received complex signal TX, and the code data from the code mapping unit 8 and takes the correlation of both to output a quadrature component correlation result.

Additionally, this correlating operator 3 realizes the operation of a second term $\{TXq \cdot (Ci+Cq)\}$ in the rightmost side of the above-described [Equation 6].

The inside of the correlating operator 3 is constituted of a data register 31 formed of a plurality of shift registers for successively time-shifting and outputting and holding the quadrature component TXq of the received complex signal TX, a plurality of multipliers 33 for performing multiplication of the data outputted from the data register 31 and the data outputted from the code register 12 of the correlating operator 1, and an adder 34 for adding multiplication results in the multipliers 33.

Additionally, the data register 31, a plurality of multipliers 33, and adder 34 herein correspond to the claimed data quadrature component register, quadrature component multiplier group (quadrature component multiplying unit), and quadrature component adder (quadrature component adding unit), respectively.

The power adding operator 7 performs the power adding operation of the in-phase component correlation result outputted from the correlating operator 1 and the quadrature component correlation result outputted from the correlating operator 3, and outputs a final correlating operation result. Specifically, the power adding operator 7 is a power adding operator for performing the power adding operation of the in-phase component correlation result and the quadrature component correlation result.

The operation in the first matched filter of the present invention comprises adding or subtracting the in-phase component Ci and quadrature component Cq of the received code sequence C* in the code mapping unit 8, and outputting the code data.

Furthermore, in the correlating operator 1, the in-phase component TXi of the received complex signal TX successively time-shifted, held in the data register 11 and outputted, and the code data from the code mapping unit 8 successively time-shifted, held in the received code register 12 and outputted are subjected to the multiplying operation in each multiplier 13, the multiplication results are added in the adder 14, and the in-phase component correlation result is outputted.

Similarly, in the correlating operator 3, the quadrature component TXq of the received complex signal TX successively time-shifted, held in the data register 31 and outputted, and the code data accumulated in the received code register 12 of the correlating operator 1 and outputted are subjected to the multiplying operation in each multiplier 33, the multiplication results are added in the adder 34, and the quadrature component correlation result is outputted.

Subsequently, the in-phase component correlation result from the correlating operator 1 and the quadrature component correlation result from the correlating operator 3 are subjected to the power adding operation in the power adding operator 7, the final correlating operation result is outputted, and the selection of the received code sequence and the path detection are performed based on the output.

Figure 4:
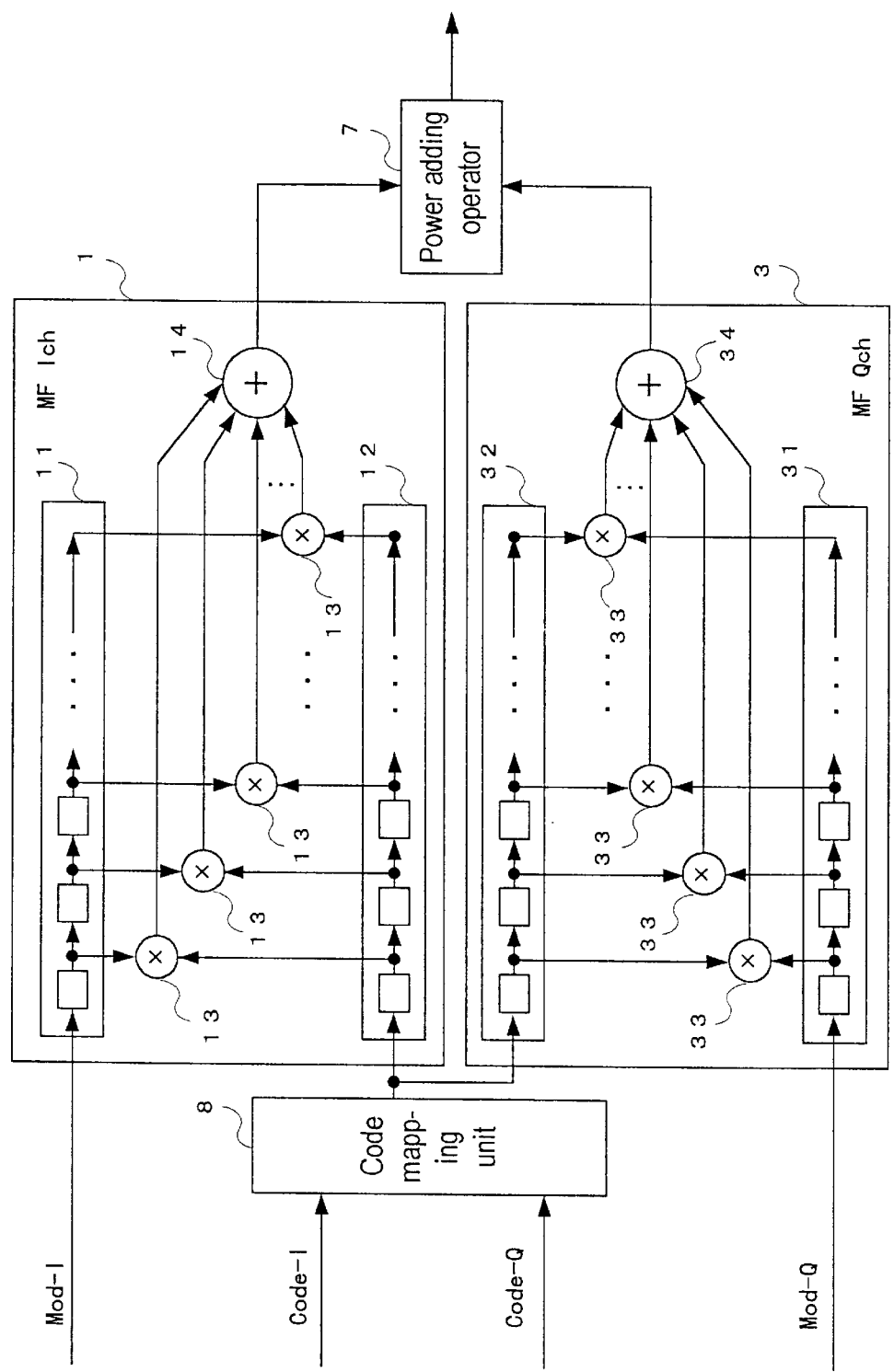
FIG. 4 is a block diagram showing another constitution example of the matched filter according to the first embodiment of the present invention.

Additionally, in the above-described matched filter of FIG. 1, the code register for use is common to the correlating operators 1 and 3, but as shown in FIG. 4, separately from the code register 12 inside the correlating operator 1 (corresponding to the first code data register in the claim), a code register 32 (corresponding to the second code data register in the claim) for successively time-shifting and outputting and holding the code data from the code mapping unit 8 may also be disposed inside the correlating operator 3, so that a plurality of multipliers 33 perform the multiplication of the data outputted from the data register 31 and the data outputted from the code register 32. In this case, the correlating operators 1 and 3 have similar circuit constitutions, and the device manufacture process can effectively be simplified. FIG. 4 is a block diagram showing another constitution example of the matched filter according to the first embodiment of the present invention.

As described above, according to the first matched filter of the present invention, the code data obtained by adding or subtracting the in-phase and quadrature components of the received code sequence in the code mapping unit 8, and the in-phase component of the received complex signal are subjected to the correlating operation in the correlating operator 1. Additionally, the code data and the quadrature component of the received complex signal are subjected to the correlating operation in the correlating operator 3, and the result is subjected to the power adding operation in the power adding operator 7 to obtain the correlation output, so that even in the QPSK modulation.the constitution can be realized by two correlating operators, while the conventional matched filter needs to be constituted by four operators. This produces an effect that the circuit scale of the matched filter can remarkably be reduced.

Another (second) embodiment of the present invention will next be described.

Since the correlating operation method and the matched filter according to the second embodiment of the present invention comprise ternary-converting and inputting the in-phase component and quadrature component of the received complex signal, performing the correlating operation with the in-phase and quadrature components of the received code sequence, and performing power adding operation of the in-phase component correlation result and the quadrature component correlation result to obtain a correlating operation output, the ternary-converted components of the received complex signal are subjected to the correlating operation. Therefore, the constitution of the multiplying section and multiplication result adding section during the correlating operation is reduced, while the sensitivities in the selection of the received code sequence and the path detection can be held to some degrees, as compared with the matched filter for binary-converting and taking the components of the received complex signal.

Figure 2:
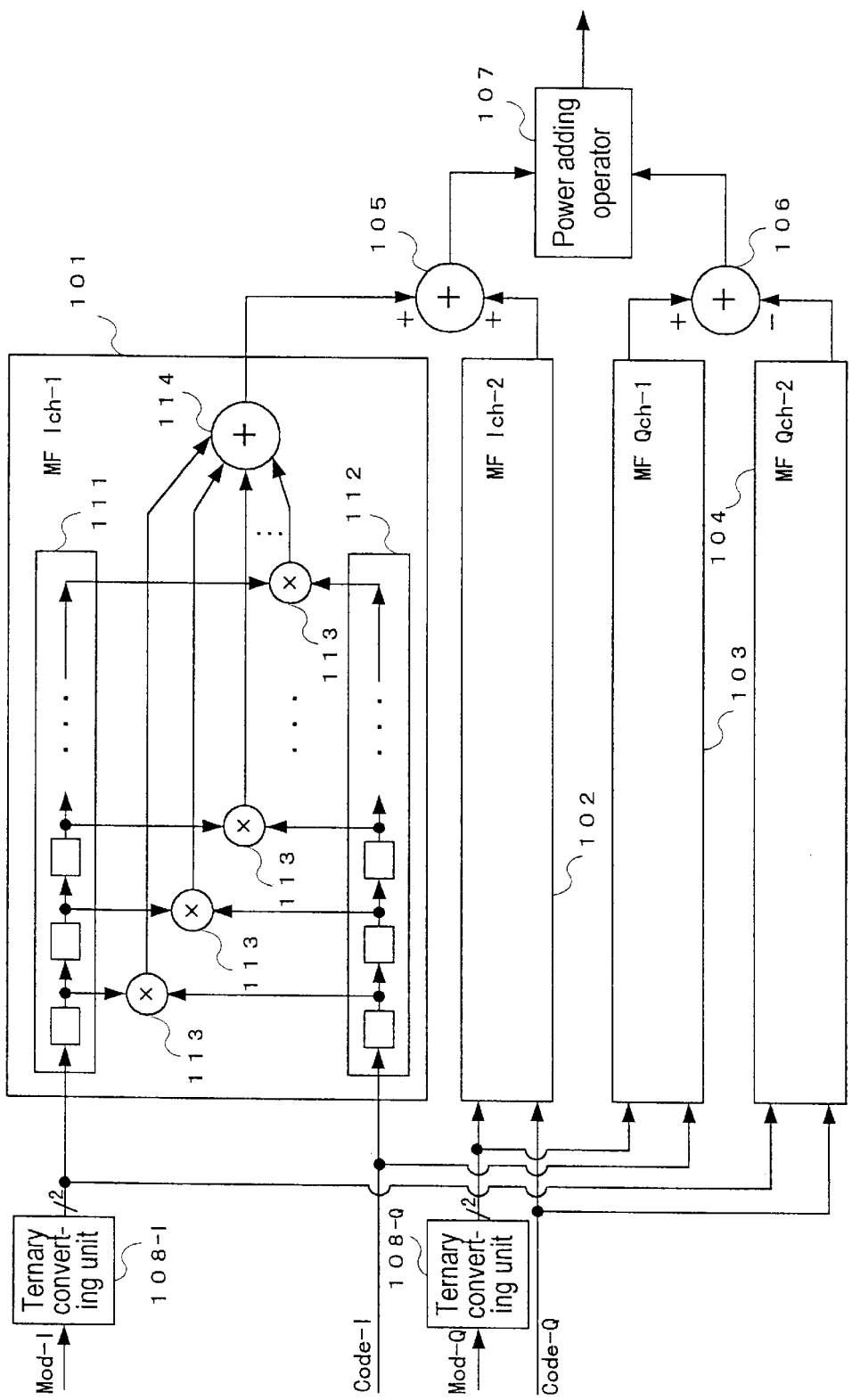
FIG. 2 is a constitution block diagram of the matched filter according to a second embodiment of the present invention.

The matched filter according to the second embodiment of the present invention will be described with reference to FIG. 2. FIG. 2 is a constitution block diagram of the matched filter according to the second embodiment of the present invention. Additionally, the section having the constitution similar to that of FIG. 7 is denoted with the same numerals and described.

As shown in FIG. 2, the matched filter (second matched filter) according to the second embodiment of the present invention is provided with ternary converting units 108-I, 108-Q as the characteristic sections of the present invention, instead of the binary converting unit 109 in the matched filter shown in FIG. 7, in addition to four correlating operators 101, 102, 103, 104, two adders 105, 106, and a power adding operator 107, which are constituted in the same manner as in the conventional matched filter.

Additionally, the ternary converting units 108-I, 108-Q herein correspond to the claimed first and second ternary converting units, respectively, the correlating operators 101, 102, 103, 104 correspond to the first, second, third, and fourth correlating operators, and the adders 105, 106 correspond to the claimed in-phase component adder and quadrature component adder, respectively.

Here, in the ternary converting unit 108, the received complex signal is ternarized with two bits (e.g., "00", "01", "11"), two bits of data are outputted to each correlating operator, the ternary converting unit 108-I ternarizes the in-phase component of the received complex signal, and the ternary converting unit 108-Q ternarizes the quadrature component of the received complex signal.

The other sections of the second matched filter of the present invention operate in the same manner as in the conventional filter, but are different in that the received complex signal inputted to each correlating operator corresponds to ternarized two bits.

Additionally, in the constitution shown in FIG. 2, the data register 111 in the correlating operator 101 is common with the data register (not shown) in the correlating operator 104, and the data register (not shown) in the correlating operator 102 may be common with the data register (not shown) in the correlating operator 103.

Furthermore, the operation of the second matched filter of the present invention comprises: two-bit ternarizing the components of the received complex signal TX in the ternary converting unit 108 (e.g., "00", "01", "11"); successively time-shifting and accumulating the components in the data register 111 or the like; and multiplying, for example, "00" as decimal 0, "01" as decimal +1, and "11" as decimal −1 by the received code sequence (−1 or +1) in each multiplier 113, so that 0, +1, or −1 is obtained in decimal notation as a result.

This multiplication result can be represented as "00", "01", "11" in binary notation, and in order to perform the addition of multiplication results, the required number of two-bit adders may be prepared in the same manner as in the matched filter shown in FIG. 7.

Specifically, in the second matched filter of the present invention, the hardware scale subsequent to the multiplier 113 and adders 114, 105, 106 is the same as that of the matched filter shown in FIG. 7, and the dynamic range of the received complex signal becomes 1.5 times. Therefore, with the circuit constitution substantially similar to that of the matched filter of FIG. 7, the sensitivities in the selection of codes and detection of signal paths can be enhanced as compared with the conventional matched filter, which provides an effect that the detection sensitivity is held to some degrees, even if the circuit scale compared to the Matched Filter is unchanged.

A third embodiment constituted by combining the first and second embodiments of the present invention will next be described.

Since the matched filter according to the third embodiment of the present invention performs the correlating operation of the code data obtained by adding or subtracting the in-phase and quadrature components of the received code sequence, and the ternary-converted in-phase and quadrature components of the received complex signal, and performs the power adding operation of the result to obtain a correlation output, the section for performing the correlating operation of the received complex signal and received code sequence can be implemented by two sections. Furthermore, since the components of the received complex signal are ternary-converted and the number of bits is reduced before taking the components, the scales of the multipliers and adders can be reduced, and the sensitivities in the selection of received code sequence and the path detection are held to some degrees, while the circuit scale can remarkably be reduced compared to conventional Matched Filter.

Figure 3:
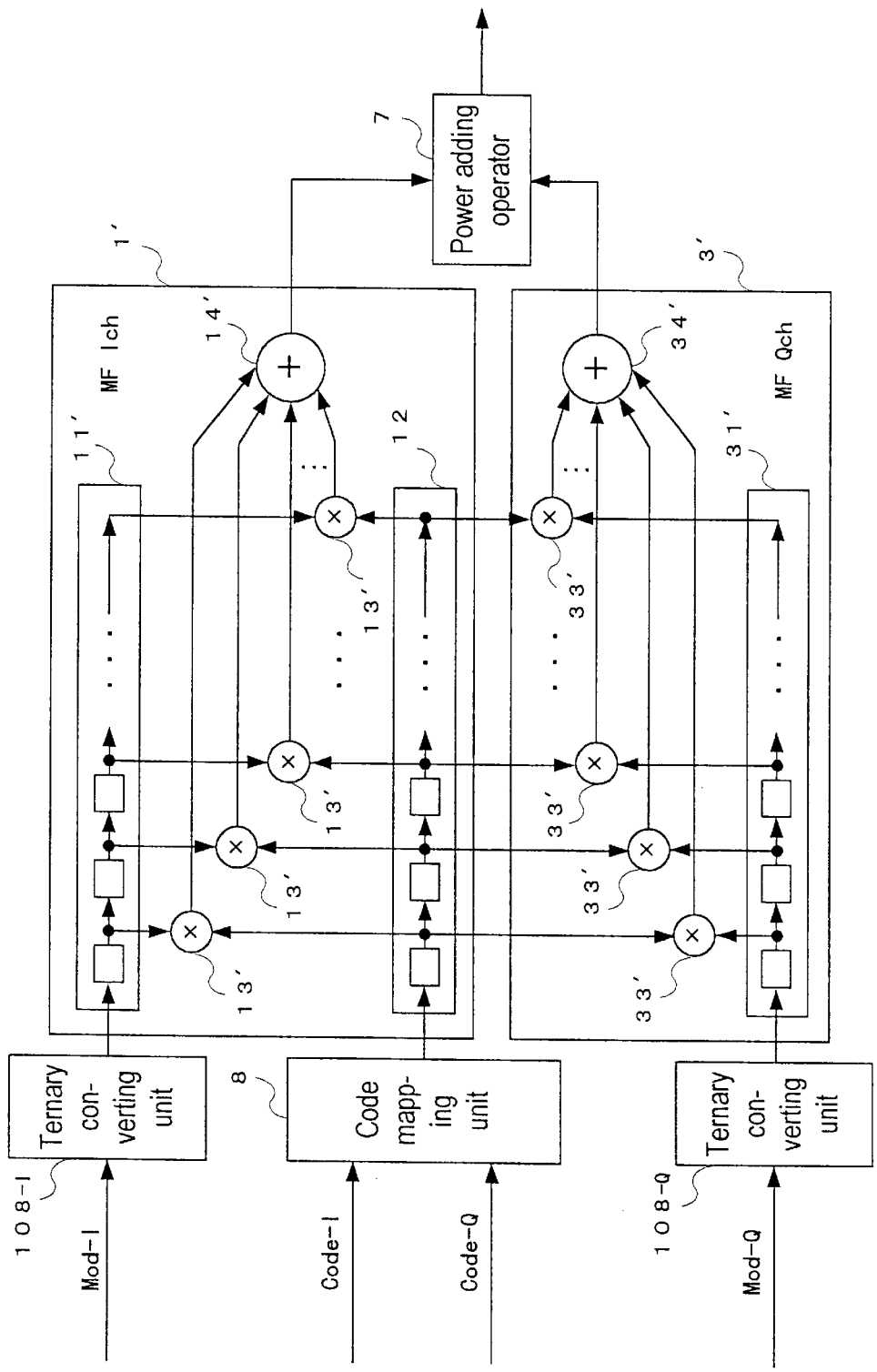
FIG. 3 is a constitution block diagram of the matched filter according to a third embodiment of the present invention.

The matched filter according to the third embodiment of the present invention will be described with reference to FIG. 3. FIG. 3 is a constitution block diagram of the matched filter according to the third embodiment of the present invention. Additionally, the section constituted in the same manner as in FIGS. 1 and 2 is denoted with the same reference numerals and described.

The matched filter (third matched filter) according to the third embodiment of the present invention is, as shown in FIG. 3, provided with a code mapping unit 8, correlating operator 1', correlating operator 3', and power adding operator 7, which are constituted in the same manner as in the first matched filter, and is further provided with ternary converting units 108-I, 108-Q, which are constituted in the same manner as in the second matched filter.

The operation of the third matched filter of the present invention comprises: adding or subtracting the in-phase component and quadrature component of the received code sequence C* in the code mapping unit 8, and outputting the code data.

Subsequently, the in-phase component of the received complex signal TX two-bit ternarized in the ternary converting unit 108-I, inputted to the correlating-operator 1', successively time-shifted, held in the data register 11' and outputted, and the code data from the code mapping unit 8 successively time-shifted, accumulated in the received code register 12 and outputted are subjected to the multiplying operation in each multiplier 13', and the multiplication results are added in the adder 14', so that the in-phase component correlation result is outputted.

Similarly, the quadrature component of the received complex signal TX is two-bit ternarized in the ternary converting unit 108-Q, inputted in the correlating operator 3', successively time-shifted, held in the data register 31', outputted, and subjected to the multiplying operation in each multiplier 33'. The multiplication result is added in the adder 34', and the quadrature component correlation result is outputted.

Subsequently, the in-phase component from the correlating operator 1' and the quadrature component from the correlating operator 3' are subjected to the power adding operation in the power adding operator 7, a final correlating operation result is outputted, and the selection of the received code sequence and the detection of the path are performed based on the output.

Figure 5:
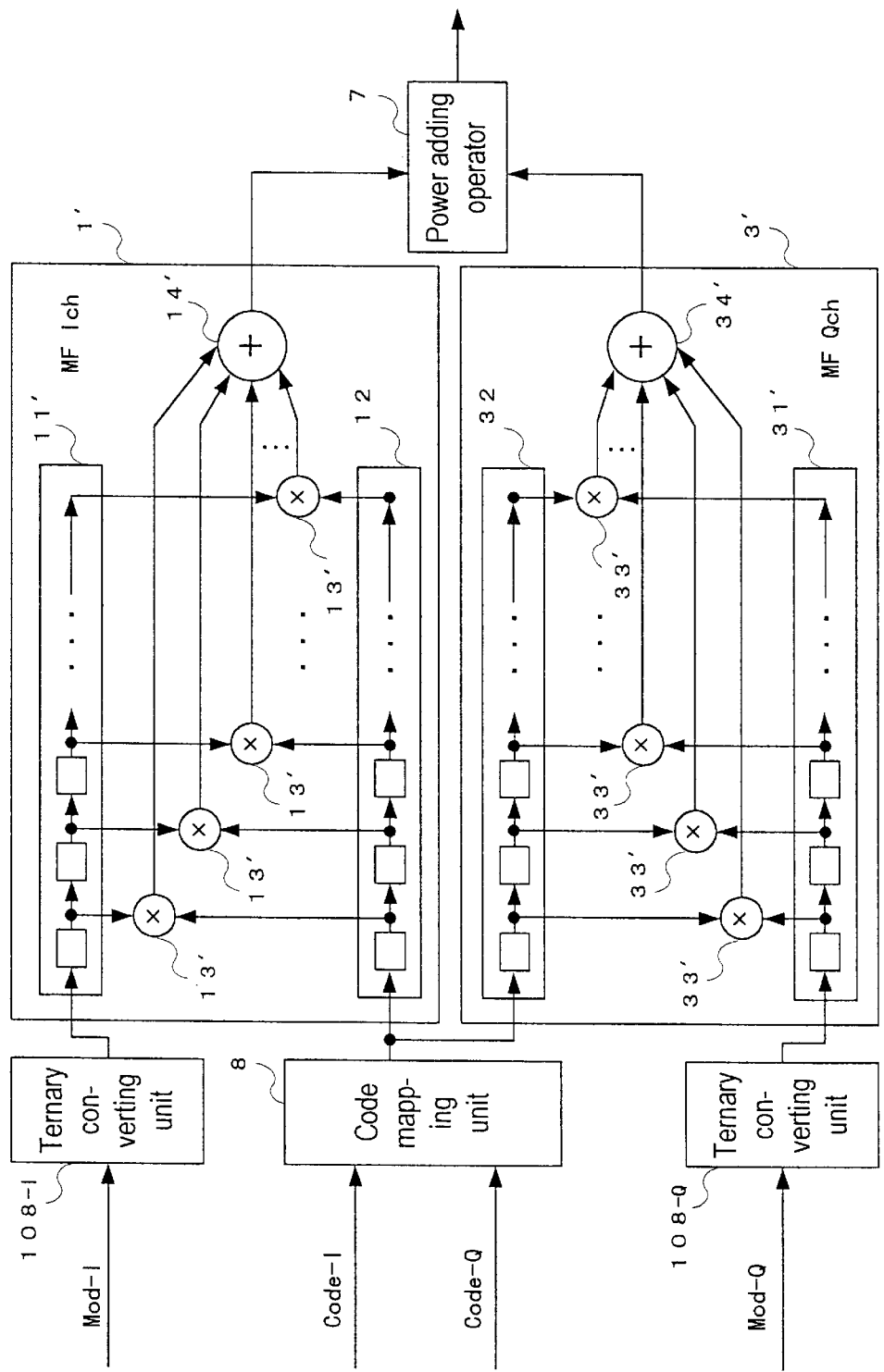
FIG. 5 is a block diagram showing another constitution example of the matched filter according to the third embodiment of the present invention.
Figure 6:
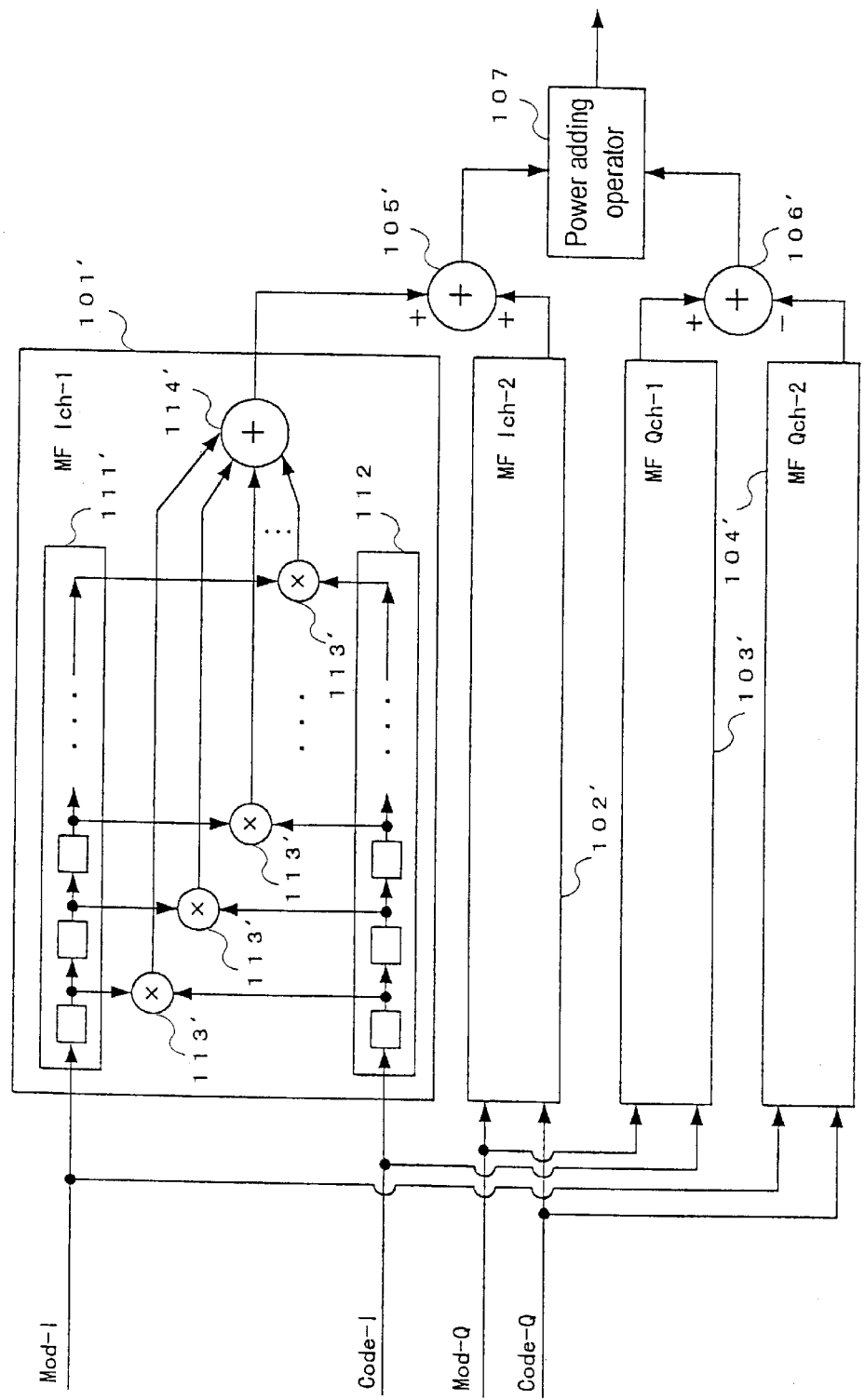
FIG. 6 is a constitution block diagram of a conventional matched filter.

Additionally, in the above-described matched filter of FIG. 3, the code register for use is common to the correlating operators 1' and 3', but as shown in FIG. 5, separately from the code register 12 inside the correlating operator 1' (corresponding to the first code data register in the claim), a code register 32 (corresponding to the second code data register in the claim) for successively time-shifting and outputting and holding the code data from the code mapping unit 8 may also be disposed inside the correlating operator 3', so that a plurality of multipliers 33 perform the multiplication of the data outputted from the data register 31 and the data outputted from the code register 32. In this case, the correlating operators 1' and 3' have similar circuit constitutions, and the device manufacture process can effectively be simplified. FIG. 5 is a block diagram showing another constitution example of the matched filter according to the third embodiment of the present invention.

According to the third matched filter of the present invention, since the code data obtained by adding or subtracting the in-phase and quadrature components of the received code sequence in the code mapping unit 8, and the components of the received complex signal are correlating-operated in the correlating operators 1', 3', and the result is power-adding operated in the power adding operator 7, even in the QPSK modulation the matched filter can be realized by two correlating operators in the same manner as in the first matched filter, which produces an effect that the circuit scale of the matched filter can remarkably be reduced.

Furthermore, in the third matched filter of the present invention, since the received complex signal is two-bit ternarized and the number of bits is reduced before taking the signal into the correlating operators 1', 3', by reducing the hardware scales of the data registers 11', 31', multipliers 13', 33', adders 14', 34', and the like, an effect can be produced that the sensitivities in the selection of received code sequence and the path detection are held to some degrees, while the circuit scale of the matched filter can further be reduced.

According to the first to third matched filters of the present invention, by remarkably reducing the circuit scale, the power consumption can remarkably and effectively be curtailed.

According to the present invention, there is provided a matched filter which performs the correlating operation of the code data obtained by adding or subtracting the in-phase and quadrature components of the received code sequence, and the in-phase and quadrature components of the received complex signal, and performs the power adding operation of the in-phase component correlation result and the quadrature component correlation result to obtain the correlating operation output, so that by realizing the section for performing the correlating operation of the received code sequence and received complex signal by two sections, effects can be produced that the circuit scale of the matched filter can remarkably be reduced and that the power consumption can remarkably be curtailed.

Furthermore, according to the present invention, there is provided the correlating operation method and matched filter in which the in-phase component and quadrature component of the received complex signal are ternarized and subjected to the correlating operation with the received code sequence, and the in-phase component correlation result and the quadrature component correlation result are subjected to the power adding operation to obtain the correlating operation output. Since the components of the received complex signal are ternarized and the number of bits is reduced before taking, shifting, accumulating, further multiplying and adding the components, the constitution of the multiplying section and multiplication result adding section during the correlating operation is reduced, while the sensitivities in the selection of received code sequence and path detection can effectively be held to some degrees as compared with the matched filter for binarizing and taking the components of the received complex signal.

Additionally, according to the present invention, there is provided the correlating operation method and matched filter in which the in-phase component and quadrature component of the received complex signal are ternary-converted and subjected to the correlating operation with the code data obtained by adding or subtracting the in-phase component and quadrature component of the received code sequence, and the in-phase component correlation result and quadrature component correlation result are subjected to the power adding operation to obtain the correlating operation output, so that by realizing the section for performing the correlating operation of the received code sequence and received complex signal by two sections, the circuit scale is remarkably reduced. Furthermore, by ternary-converting the components of the received complex signal to perform the correlating operation, the sensitivities in the selection of received code sequence and path detection are held to some degrees, while the constitution of the correlating operation section can further be reduced. This further produces an effect that the power consumption can remarkably be curtailed.

What is claimed is:

1. A correlating operation method comprising:
performing correlating operation of code data obtained by adding or subtracting an in-phase component and a quadrature component of a received code sequence, and an in-phase component and a quadrature component of a received complex signal; and performing power adding operation of a correlation result of said in-phase component and a correlation result of said quadrature component to obtain a correlating operation output.

2. The correlating operation method according to claim 1 wherein after the in-phase component and the quadrature component of the received complex signal are ternary-converted, the correlating operation with the code data is performed.

3. A matched filter comprising:
a data in-phase component register for successively time-shifting and outputting and accumulating an in-phase component of a received complex signal;
a data quadrature component register for successively time-shifting and outputting and accumulating a quadrature component of said received complex signal;
a code mapping unit for adding or subtracting an in-phase component and a quadrature component of a received code sequence to output code data;
a code data register for successively time-shifting and outputting and accumulating said code data;
an in-phase component multiplier group for multiplying an output of said data in-phase component register and an output of said code data register;
an in-phase component adder for adding an output of said in-phase component multiplier group to output an in-phase component correlation result;
a quadrature component multiplier group for multiplying an output of said data quadrature component register and an output of said code data register;
a quadrature component adder for adding an output of said quadrature component multiplier group to output a quadrature component correlation result; and
a power adding operator for performing power adding operation of said in-phase component correlation result and said quadrature component correlation result to output a correlating operation result.

4. The matched filter according to claim 3 comprising: a first ternary converting unit for ternary-converting the in-phase component of the received complex signal; and a second ternary converting unit for ternary-converting the quadrature component of the received complex signal, wherein
the data in-phase component register successively time-shifts and outputs and accumulates an output of said first ternary converting unit, and
the data quadrature component register successively time-shifts and outputs and accumulates an output of said second ternary converting unit.

5. A correlating operation method comprising:
inputting an in-phase component and a quadrature component of a received code sequence, and ternary-converting and inputting an in-phase component and a quadrature component of a received complex signal;
performing a first correlating operation of said ternary-converted in-phase component of the received complex signal and the in-phase component of said received code sequence, a second correlating operation of the ternary-converted quadrature component of the received complex signal and the quadrature component of said received code sequence, a third correlating operation of said ternary-converted quadrature component of the received complex signal and the in-phase component of said received code sequence, and a fourth correlating operation of said ternary-converted in-phase component of the received complex signal and the quadrature component of said received code sequence;
adding results of said first and second correlating operations to output an in-phase component correlation result, and adding results of said third and fourth correlating operations to output a quadrature component correlation result; and
performing power adding operation of said in-phase component correlation result and said quadrature component correlation result to obtain a correlating operation output.

6. A matched filter comprising:
a first ternary converting unit for ternary-converting an in-phase component of a received complex signal, and a second ternary converting unit for ternary-converting a quadrature component of the received complex signal;
a first correlating operator for inputting an output of said first ternary converting unit and an in-phase component of a received code sequence, and performing correlating operation;
a second correlating operator for inputting an output of said second ternary converting unit and a quadrature component of the received code sequence, and performing the correlating operation;
a third correlating operator for inputting the output of said second ternary converting unit and the in-phase component of the received code sequence, and performing the correlating operation;
a fourth correlating operator for inputting the output of said first ternary converting unit and the quadrature component of the received code sequence, and performing the correlating operation;
an in-phase component adder for adding an output of said first correlating operator and an output of said second correlating operator to output an in-phase component correlation result;

a quadrature component adder for adding an output of said third correlating operator and an output of said fourth correlating operator to output a quadrature component correlation result; and a power adding operator for performing power adding operation of said in-phase component correlation result and said quadrature component correlation result to output a correlating operation result, said each correlating operator comprising:

a data register for successively time-shifting and outputting and accumulating an input from said first ternary converting unit and said second ternary converting unit;

a code register for successively time-shifting and outputting and accumulating the in-phase component of said received code sequence and:the quadrature component of said received code sequence;

a multiplier group for multiplying an output of said data register and an output of said code register; and an adder for adding and outputting an output of said multiplier group.

7. The matched filter according to claim 6 wherein the data register in the first correlating operator and the data register in the fourth correlating operator are common, and the data register in the second correlating operator and the data register in the third correlating operator are common.

8. A matched filter comprising:

a data in-phase component register for successively time-shifting and outputting and accumulating an in-phase component of a received complex signal;

a data quadrature component register for successively time-shifting and outputting and accumulating a quadrature component of said received complex signal;

a code mapping unit for adding or subtracting an in-phase component and a quadrature component of a received code sequence to output code data;

a first code data register and a second code data register for successively time-shifting and outputting and accumulating said code data;

an in-phase component multiplier group for multiplying an output of said data in-phase component register and an output of said first code data register;

an in-phase component adder for adding an output of said in-phase component multiplier group to output an in-phase component correlation result;

a quadrature component multiplier group for multiplying an output of said data quadrature component register and an output of said second code data register;

a quadrature component adder for adding an output of said quadrature component multiplier group to output a quadrature component correlation result; and a power adding operator for performing power adding operation of said in-phase component correlation result and said quadrature component correlation result to output a correlating operation result.

9. The matched filter according to claim 8 comprising: a first ternary converting unit for ternary-converting the in-phase component of the received complex signal; and a second ternary converting unit for ternary-converting the quadrature component of the received complex signal, wherein the data in-phase component register successively time-shifts and outputs and accumulates an output of said first ternary converting unit, and the data quadrature component register successively time-shifts and outputs and accumulates an output of said second ternary converting unit.

10. A matched filter comprising: an adding/subtracting unit for adding or subtracting an in-phase component and a quadrature component of a received code sequence to output code data; an in-phase component multiplying unit for multiplying in-phase component data obtained by successively time-shifting an in-phase component of a received complex signal and the code data outputted from said adding/subtracting unit; a quadrature component multiplying unit for multiplying quadrature component data obtained by successively time-shifting a quadrature component of the received complex signal and the code data outputted from said adding/subtracting unit; an in-phase component adding unit for adding an output from said in-phase component multiplying unit to output an in-phase component correlation result; a quadrature component adding unit for adding an output from said quadrature component multiplying unit to output a quadrature component correlation result; and a power adding operation unit for performing power adding operation of said in-phase component correlation result and said quadrature component correlation result to output a correlating operation result.

11. The matched filter according to claim 10 comprising: a first ternary converting unit for ternary-converting the in-phase component of the received complex signal; and a second ternary converting unit for ternary-converting the quadrature component of the received complex signal, wherein the adding/subtracting unit adds or subtracts an output from said first ternary converting unit and an output from said second ternary converting unit to output the code data.

* * * * *